United States Patent [19]

Bertram et al.

[11] Patent Number: 4,482,692

[45] Date of Patent: Nov. 13, 1984

[54] EPOXY RESIN COMPOSITIONS

[75] Inventors: James L. Bertram; William Davis, both of Lake Jackson; Louis L. Walker, Clute, all of Tex.

[73] Assignee: The Dow Chemical Company, Midland, Mich.

[21] Appl. No.: 544,671

[22] Filed: Oct. 24, 1983

[51] Int. Cl.$^3$ .............................................. C08G 59/02
[52] U.S. Cl. ..................................... 528/93; 525/504; 525/510; 528/94; 528/98; 528/99; 528/102; 528/104; 528/118
[58] Field of Search .................. 528/99, 98, 104, 102, 528/118, 93, 94; 525/504, 510

[56] References Cited

U.S. PATENT DOCUMENTS

| | | | |
|---|---|---|---|
| 4,014,955 | 3/1977 | Renner | 525/481 |
| 4,187,377 | 2/1980 | Narisawa et al. | 524/577 X |
| 4,189,577 | 2/1980 | Sawa et al. | 528/118 X |

FOREIGN PATENT DOCUMENTS 56-26925  3/1981  Japan .

*Primary Examiner*—Earl A. Nielsen
*Attorney, Agent, or Firm*—J. G. Carter

[57] ABSTRACT

Epoxy resin compositions are disclosed which are the reaction products resulting from reacting (A) the reaction product of a cyanuric halide and at least one dihydric or polyhydric phenol with (B) at least one dihydric or polyhydric phenol and (C) at least one epoxy resin having an average of more than one epoxy group per molecule. These epoxy resin compositions are suitable for use as electrical laminates, structural laminates, coatings, castings, electrical encapsulation and the like.

20 Claims, No Drawings

EPOXY RESIN COMPOSITIONS

BACKGROUND OF THE INVENTION

The present invention is directed to epoxy resin compositions and cured products prepared therefrom.

The present invention provides for epoxy resin compositions having utility as electrical laminates, electrical encapsulation, castings, coatings and the like.

SUMMARY OF THE INVENTION

The present invention concerns an epoxy resin composition prepared by reacting
(A) a reaction product of
  (1) a cyanuric halide with
  (2) at least one di- and/or polyhydric aromatic compound in a quantity which provides at least about 6, preferably from about 8 to about 15 phenolic hydroxyl groups contained in component A-2 per mole of component A-1; with
(B) at least one dihydric or polyhydric phenol and
(C) at least one epoxy resin having an average of more than one epoxy group per molecule wherein components A, B and C are present in quantities which provides an epoxy to phenolic hydroxyl ratio of from about 2.25:1 to about 10:1, preferably from about 2.5:1 to about 7.5:1 and wherein component (B) can be added as a separate component and/or it can be incorporated into the composition as unreacted component A-2.

The present invention also pertains to the product resulting from curing the above epoxy resin composition with a curing quantity of a suitable catalyst or curing agent.

DETAILED DESCRIPTION OF THE INVENTION

Suitable dihydric and polyhydric phenols which can be employed in the present invention as either components (A-2) or (B) include, for example, those represented by the formulas

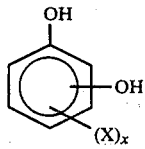
I.

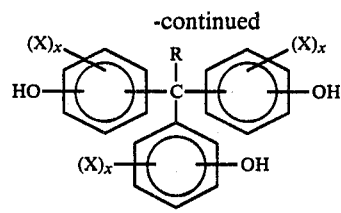
II.

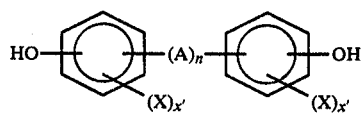
III.

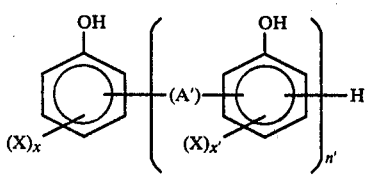
IV.

wherein A is a divalent hydrocarbyl group having from 1 to about 10 carbon atoms, —O—, —S—, —S—S—,

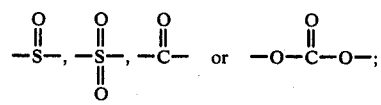

A' is a divalent hydrocarbyl group having from 1 to about 10 carbon atoms; R is hydrogen or a hydrocarbyl group having from 1 to about 10 carbon atoms; each X is independently a monovalent hydrocarbyl group having from 1 to about 10 carbon atoms, or a halogen; n has a value of zero or 1; n' has a value of from about 1.01 to about 7; x has a value of from zero to about 4 and x' has a value of from zero to about 3.

Suitable such phenolic hydroxyl-containing compounds include, for example, resorcinol, catechol, hydroquinone, phloroglucinol, bisphenol A, tetramethyl bisphenol A, tetra-tetrarybutylbisphenol A, tetrabromo bisphenol A, mixtures thereof and the like.

Suitable cyanuric halides which can be employed herein include, for example, cyanuric chloride, cyanuric bromide, mixtures thereof and the like.

The reaction between the cyanuric halide and dihydric or polyhydric phenol is usually conducted in the presence of a base such as, for example, alkali metal hydroxides, alkali metal carbonates, alkali metal alcoholates, tertiary amines and the like. These and other catalysts as well as suitable reaction conditions are more fully described by Sundermann et al in U.S. Pat. No. 3,978,028 which is incorporated herein by reference.

Suitable epoxy resins which can be employed herein include those represented by the formulas

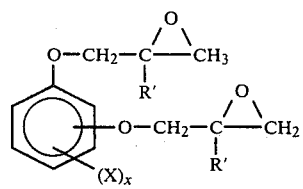
V.

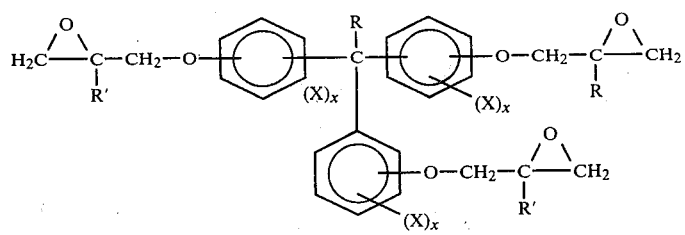

VI.

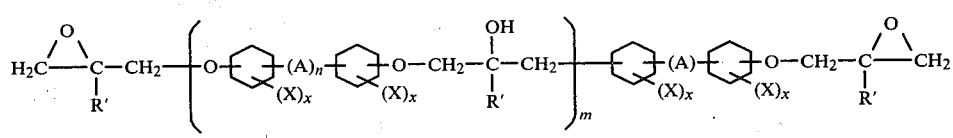

VII.

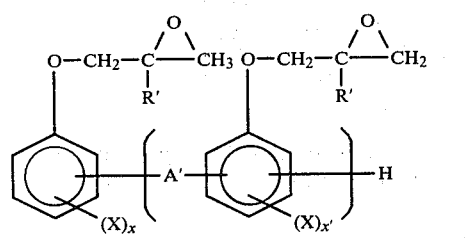

VIII.

wherein A, A', R, X, n, n', x and x' are as defined in formulas I, II, III and IV, R' is hydrogen or a hydrocarbyl group having from 1 to about 4 carbon atoms and m has an average value of from zero to about 10.

Suitable curing agents and/or catalysts which can be employed include, for example, amines, acids and anhydrides thereof, biguanides, imidazoles, urea-aldehyde resins, melamine aldehyde resins and the like. These and other curing agents and/or catalysts are disclosed in Lee and Neville's *Handbook of Epoxy Resins*, McGraw-Hill, 1967 which is incorporated herein by reference.

The following examples are illustrative of the invention but are not to be construed as to limiting the scope thereof in any manner.

EXAMPLE 1

Aqueous caustic solution, 12.6 g dissolved in 113.4 grams of water (10 wt. %) was continuously added to 18.4 grams of cyanuric chloride and 163.2 grams of tetrabromo disphenol A dissolved in 50 ml. of acetone and 150 ml of isopropanol during approximately one hour at a temperature of 20°-25° C. A precipitate formed. This slurry was stirred overnight at ambient temperature, then with good stirring poured into 1.5 liters of water. The solid product was washed with excess water, then collected via filtration. After drying in a vacuum oven at 80°-100° C., 170 g of white product was obtained, percent yield, 99.9%. The product had a bromine content of 56.2%, a melting point of 140°-145° C., and a hydroxyl content of 4.18%.

EXAMPLE 2

The condensate prepared in Example 1 was employed to prepare epoxy resins with different quantities of epoxy resin and dihydric or polyhydric phenol compounds. The quantities and reaction conditions are given in Table I. The resultant epoxy resins were cured with 3 parts per hundred parts of epoxy resin of dicyandiamide and 0.3% by weight of epoxy resin of benzyl dimethyl amine at 175° C. for one hour (3600 s). The results are given in Table I.

TABLE I

| COMPONENTS AND RESULTS | EXAMPLE 1 | EXAMPLE 2 | EXAMPLE 3 | EXAMPLE 4 | EXAMPLE 5 | EXAMPLE 6 |
|---|---|---|---|---|---|---|
| Adduct from Ex. 1, g/equiv. | 129/0.31 | 12.6/0.03 | 117.4/0.28 | 31/0.074 | 176/0.42 | 15.2/00.036 |
| tetrabromobisphenol A, g/equiv. | 129/0.47 | 12.6/0.046 | 117.4/0.43 | 0 | 58.7/0.22 | 22.8/0.084 |
| DGEBA[1], g/equiv. | 492/2.62 | 74.8/0.40 | 515.3/2.74 | 69/0.37 | 515.3/2.74 | 62/0.33 |
| Reaction Temp., °C. | 160 | | | | | 160 |
| Reaction Time, hours | 1 | 3.5 | 4 | 5 | 6 | 1.5 |
| seconds | 3600 | 12600 | 14400 | 18000 | 21600 | 5400 |
| Average Epoxide Content, % | 9.9 | 12.6 | 10.1 | 10.05 | 10 | 8 |
| EEW[2] | 434.3 | 341.3 | 425.7 | 427.86 | 430 | 537.5 |
| Bromine Content, % | 20.35 | 14.5 | 18 | 17.4 | 17.8 | 22.2 |
| Tg[3], °C. | 133.6 | N.D.[4] | 131.1 | N.D. | 137.4 | N.D. |

[1]DGEBA was the diglycidyl ether of bisphenol A having an average EEW of 187.8.
[2]EEW = epoxide equivalent weight
[3]Tg = glass transition temperature as determined via diferential scanning caloremetry, (DSC) using Dupont DSC, model 1090.
[4]N.D. = not determined

COMPARATIVE EXPERIMENT A

A commercially available epoxy resin made from the reaction of the diglycidylether of bisphenol A with tetrabromo bisphenol A having an average epoxy content of 9.0 percent and an average bromine content of 19-22 weight percent and containing 20% acetone by weight was formulated with dicyanamide and cured exactly as described in Examples 1-6. The cured resin had a Tg of 111° C.

We claim:

1. An epoxy resin composition prepared by reacting
   (A) a reaction product of
      (1) a cyanuric halide with
      (2) at least one di- and/or polyhydric aromatic compound in a quantity which provides at least about 6 phenolic hydroxyl groups per mole of component A-1; with
   (B) at least one dihydric or polyhydric phenol and
   (C) at least one epoxy resin having an average of more than one vicinal epoxy group per molecule wherein components A, B and C are present in quantities which provide an epoxy to phenolic hydroxyl ratio of from about 2.25:1 to about 10:1 and wherein component (B) can be added as a separate component and/or it can be incorporated into the composition as unreacted component A-2.

2. A composition of claim 1 wherein components (A-1) and (A-2) are present in quantities which provide from about 8 to about 15 phenolic hydroxyl groups per mole of component (A-1) and components (A), (B) and (C) are present in quantities which provide an epoxy to phenolic hydroxyl ratio of from about 2.5:1 to about 7.5:1.

3. A composition of claim 2 wherein
   (i) components (A-1) and (B) are independently selected from those compounds represented by formulas I, II, III or IV as shown in the specification wherein A is a divalent hydrocarbyl group having from 1 to about 10 carbon atoms, —O—, —S—, —S—S—,

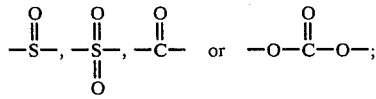

A' is a divalent hydrocarbyl group having from 1 to about 10 carbon atoms; R is hydrogen or a hydrocarbyl group having from 1 to about 10 carbon atoms; each X is independently a monovalent hydrocarbyl group having from 1 to about 10 carbon atoms, or a halogen; n has a value of zero or 1; n' has a value of from about 1.01 to about 7; x has a value of from zero to about 4 and x' has a value of from zero to about 3;
   (ii) component (C) is selected from those compounds represented by formulas V, VI, VII or VIII as shown in the specification wherein each A, A', R, X, n, n', x and x' are as defined in formulas I, II, III and IV; R' is hydrogen or a hydrocarbyl group having from 1 to about 4 carbon atoms and m has an average value of from zero to about 10.

4. A composition of claim 3 wherein
   (i) component (A-1) is selected from cyanuric chloride, cyanuric bromide, or a mixture thereof;
   (ii) components (A-2 and B) is selected from bisphenol A, tetrabromobisphenol A, or a mixture thereof; and
   (iii) component (C) is selected from diglycidyl ethers of bisphenol A having an average epoxide equivalent weight of from about 172 to about 250, diglycidyl ether of tetrabromobisphenol A having an average epoxide equivalent weight of from about 332 to about 500, or mixtures thereof.

5. A curable composition comprising a mixture of (1) a composition of claim 1 and (2) a curing quantity of a suitable curing agent and/or catalyst.

6. A curable composition comprising a mixture of (1) a composition of claim 2 and (2) a curing quantity of a suitable curing agent and/or catalyst.

7. A curable composition comprising a mixture of (1) a composition of claim 3 and (2) a curing quantity of a suitable curing agent and/or catalyst.

8. A curable composition comprising a mixture of (1) a composition of claim 4 and (2) a curing quantity of a suitable curing agent and/or catalyst.

9. A composition of claim 1 wherein said curing agent and/or catalyst is dicyanamide, 2-methylimidazole, benzyl, dimethylamine, or a mixture thereof.

10. A composition of claim 2 wherein said curing agent and/or catalyst is dicyanamide, 2-methylimidazole, benzyl dimethylamine, or a mixture thereof.

11. A composition of claim 3 wherein said curing agent and/or catalyst is dicyanamide, 2-methylimidazole, benzyl dimethylamine, or a mixture thereof.

12. A composition of claim 4 wherein said curing agent and/or catalyst is dicyanamide, 2-methylimidazole, benzyl dimethylamine, or a mixture thereof.

13. A product resulting from curing a composition of claim 5.

14. A product resulting from curing a composition of claim 6.

15. A product resulting from curing a composition of claim 7.

16. A product resulting from curing a composition of claim 8.

17. A product resulting from curing a composition of claim 9.

18. A product resulting from curing a composition of claim 10.

19. A product resulting from curing a composition of claim 11.

20. A product resulting from curing a composition of claim 12.

* * * * *